United States Patent
Kitaura

(10) Patent No.: US 11,802,770 B2
(45) Date of Patent: Oct. 31, 2023

(54) VEHICLE POSITION IDENTIFICATION DEVICE AND VEHICLE POSITION IDENTIFICATION METHOD

(71) Applicant: DENSO CORPORATION, Kariya (JP)

(72) Inventor: Kosuke Kitaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 17/199,942

(22) Filed: Mar. 12, 2021

(65) Prior Publication Data
US 2021/0293547 A1  Sep. 23, 2021

(30) Foreign Application Priority Data
Mar. 18, 2020 (JP) .................... 2020-048244

(51) Int. Cl.
| | |
|---|---|
| *G01C 1/00* | (2006.01) |
| *G01C 21/30* | (2006.01) |
| *G01C 21/36* | (2006.01) |
| *G06T 7/70* | (2017.01) |
| *G06V 20/56* | (2022.01) |

(52) U.S. Cl.
CPC ........ *G01C 21/30* (2013.01); *G01C 21/3602* (2013.01); *G06T 7/70* (2017.01); *G06V 20/56* (2022.01); *G06T 2207/30252* (2013.01)

(58) Field of Classification Search
CPC ...... G01C 21/30; G01C 21/3602; G06T 7/70; G06T 2207/30252; G06V 20/56
USPC ................................................ 701/454
See application file for complete search history.

(56) References Cited

U.S. PATENT DOCUMENTS

| | | | |
|---|---|---|---|
| 9,628,958 B1* | 4/2017 | McBurney | H04W 4/027 |
| 2008/0243389 A1 | 10/2008 | Inoue et al. | |
| 2017/0294123 A1 | 10/2017 | Baba | |
| 2018/0024562 A1 | 1/2018 | Bellaiche | |
| 2019/0145781 A1* | 5/2019 | Iwai | G06V 20/582 |
| | | | 702/150 |
| 2019/0294898 A1* | 9/2019 | Jin | B60W 40/02 |
| 2020/0250854 A1 | 8/2020 | Toyoshi et al. | |

FOREIGN PATENT DOCUMENTS

| | | |
|---|---|---|
| JP | H07-035560 A | 2/1995 |
| JP | 2007-303842 A | 11/2007 |
| JP | 2009-186353 A | 8/2009 |
| JP | 2018-510373 A | 4/2018 |

* cited by examiner

*Primary Examiner* — Tyler J Lee
*Assistant Examiner* — Tiffany P Ohman
(74) *Attorney, Agent, or Firm* — MASCHOFF BRENNAN

(57) ABSTRACT

A vehicle position identification device or a vehicle position identification method for a vehicle acquires first landmark position information including a landmark distance with respect to a subject vehicle, acquires second landmark position information including a landmark elevation angle, estimates a landmark position, acquires map data including a landmark position on a map, and identify a vehicle position on the map.

8 Claims, 5 Drawing Sheets

FIG. 4

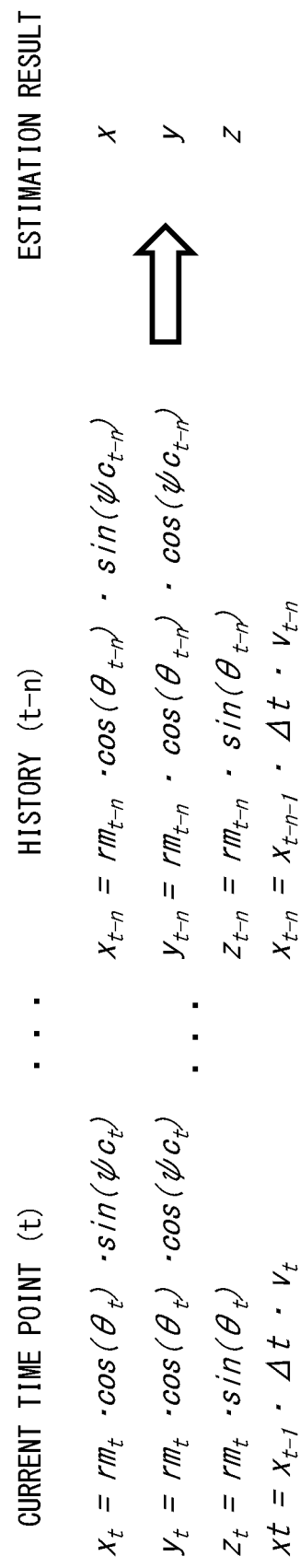

CURRENT TIME POINT (t)    . . .    HISTORY (t-n)                                         ESTIMATION RESULT $x_t = rm_t \cdot \cos(\theta_t) \cdot \sin(\psi c_t)$         $x_{t-n} = rm_{t-n} \cdot \cos(\theta_{t-n}) \cdot \sin(\psi c_{t-n})$     $x$ $y_t = rm_t \cdot \cos(\theta_t) \cdot \cos(\psi c_t)$         $y_{t-n} = rm_{t-n} \cdot \cos(\theta_{t-n}) \cdot \cos(\psi c_{t-n})$     $y$ $z_t = rm_t \cdot \sin(\theta_t)$                              $z_{t-n} = rm_{t-n} \cdot \sin(\theta_{t-n})$                             $z$ $xt = x_{t-1} \cdot \Delta t \cdot v_t$                        $x_{t-n} = x_{t-n-1} \cdot \Delta t \cdot v_{t-n}$

FIG. 5

$$\Delta x = \sqrt{(x-x_t)^2 + (x-x_{t-1})^2 + \cdots + (x-x_{t-n})^2}$$

$$\Delta y = \sqrt{(y-y_t)^2 + (y-y_{t-1})^2 + \cdots + (y-y_{t-n})^2}$$

$$\Delta z = \sqrt{(z-z_t)^2 + (z-z_{t-1})^2 + \cdots + (z-z_{t-n})^2}$$

VEHICLE POSITION IDENTIFICATION DEVICE AND VEHICLE POSITION IDENTIFICATION METHOD

CROSS REFERENCE TO RELATED APPLICATION

The present application claims the benefit of priority from Japanese Patent Application No. 2020-048244 filed on Mar. 18, 2020. The entire disclosure of the above application is incorporated herein by reference.

TECHNICAL FIELD

The present disclosure relates to a vehicle position identification device and a vehicle position identification method.

BACKGROUND

It is required to identify a vehicle position with higher accuracy for traveling control such as automatic driving of a vehicle such as automobile. As a technology for identifying the vehicle position with high accuracy, a technology for identifying the vehicle position by checking a traveling environment recognition result against a high accuracy map has been known. The traveling environment uses a sensing result of a periphery monitoring sensor that is an autonomous sensor monitoring a periphery of the vehicle.

However, it is difficult to apply the technology to a general road or the like since a maintenance of a detailed high accuracy map is huge. On the other hand, a technology of reducing the number of types of data in a map so as not to require excessive data storage or an excessive data transfer rate has been known. For example, in a comparative example, a sparse map including data related to a road and a landmark that may exist along the road is used. In the comparative example, the landmark detected from a capture image of a camera mounted on a vehicle is compared with a known landmark in the sparse map, and thereby a vehicle position is identified.

SUMMARY

A vehicle position identification device or a vehicle position identification method for a vehicle may acquire first landmark position information including a landmark distance with respect to a subject vehicle, acquire second landmark position information including a landmark elevation angle, estimate a landmark position, acquire map data including a landmark position on a map, and identify a vehicle position on the map.

BRIEF DESCRIPTION OF THE DRAWINGS

FIG. 4 is a diagram describing one example of an update process;

FIG. 5 is a diagram showing one example of expressions for calculating an estimation error.

DETAILED DESCRIPTION

Figure 1:
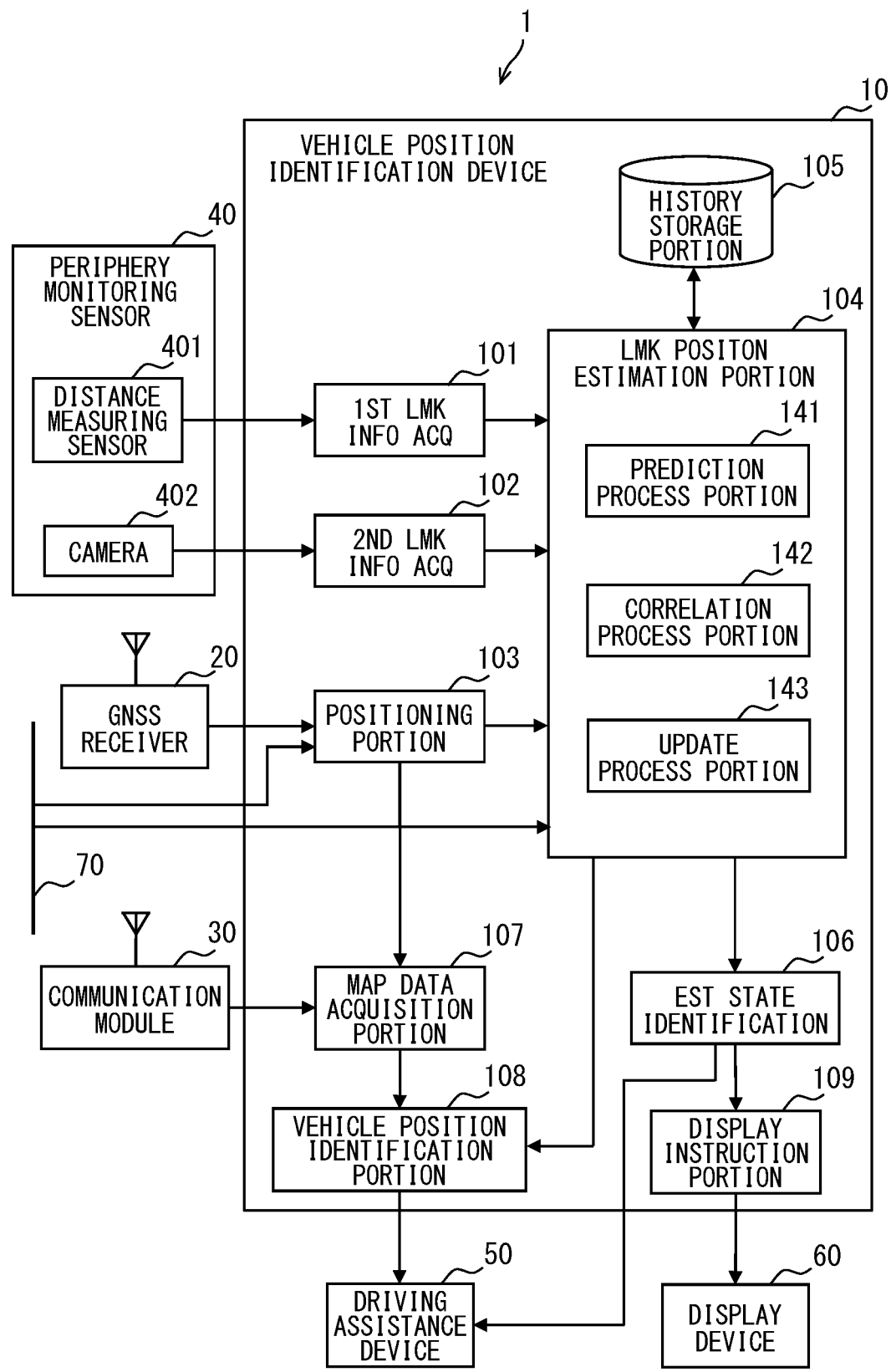
FIG. 1 is a diagram showing an example of schematic configurations of a vehicle system and a vehicle position identification device.

When a target position with respect to a subject vehicle is identified from the capture image of the camera, an accuracy in an angular direction is high. However, a distance accuracy is low. Accordingly, in the technology, the comparative example, the distance accuracy of the landmark detected from the capture image of the camera may be low. When the distance accuracy of the landmark detected from the capture image of the camera is low, the accuracy of identifying the vehicle position based on this landmark is low. When the vehicle position identification accuracy is low, use of a driving assistance application using the vehicle position may be limited.

One example of the present disclosure provides a vehicle position identification device and a vehicle position identification method capable of improving an accuracy of identifying a subject vehicle position when identifying the subject vehicle position based on a landmark position with respect to a subject vehicle detected using an autonomous sensor of the subject vehicle.

According to one example embodiment, a vehicle position identification device is used for a vehicle. The vehicle position identification device includes: a first landmark position information acquisition portion that acquires first landmark position information including, at least, a landmark distance with respect to a subject vehicle as position information of a landmark with respect to the subject vehicle, wherein the landmark is recognized from a detection result by a distance measuring sensor mounted on the vehicle, and a height of the landmark is higher than a height of a road surface; a second landmark position information acquisition portion that acquires second landmark position information including, at least, a landmark elevation angle with respect to the subject vehicle, as the position information of the landmark with respect to the subject vehicle, wherein the landmark is recognized from a capture image by a camera mounted on the vehicle; a landmark position estimation portion that estimates a landmark position with respect to the subject vehicle based on the landmark elevation angle with respect to the subject vehicle in the second landmark position information acquired by the second landmark position information acquisition portion in addition to the landmark distance with respect to the subject vehicle in the first landmark position information acquired by the first landmark position information acquisition portion; a map data acquisition portion that acquires map data including a landmark position on a map; and a vehicle position identification portion that identifies a vehicle position on the map by collating the landmark position, estimated by the landmark position estimation portion, with respect to the subject vehicle with the landmark position on the map in the map data.

According to another example embodiment, a vehicle position identification method is used for a vehicle and is performed by a computer. The vehicle position identification method includes: acquiring first landmark position information including, at least, a landmark distance with respect to a subject vehicle as position information of a landmark with respect to the subject vehicle, wherein the landmark is recognized from a detection result by a distance measuring sensor mounted on the vehicle, and a height of the landmark is higher than a height of a road surface; acquiring second landmark position information including, at least, a landmark elevation angle with respect to the subject vehicle, as the position information of the landmark with respect to the subject vehicle, wherein the landmark is recognized from a capture image by a camera mounted on the vehicle; estimating a landmark position with respect to the subject vehicle based on the landmark elevation angle with respect to the subject vehicle in an acquired second landmark position information in addition to a landmark distance with respect to the subject vehicle in an acquired first landmark position information; acquiring map data including a landmark position on a map; and identifying a vehicle position on the map by collating an estimated landmark position with respect to the subject vehicle with the landmark position on the map in the map data.

According to the configuration described above, in addition to the landmark distance recognized from the detection result by the distance measuring sensor with respect to the subject vehicle, the landmark elevation angle recognized from the capture image by the camera with respect to the subject vehicle is used for estimating the landmark position with respect to the subject vehicle, and the height of the landmark is higher than the road surface. Since the distance measuring sensor is a sensor for measuring a distance, the accuracy of the landmark distance recognized from the detection result by the distance measuring sensor with respect to the subject vehicle is high. On the other hand, the distance measuring sensor tends to have lower accuracy in the elevation angle direction with respect to the landmark having a height higher than the road surface. In this point, the configuration described above uses the elevation angle of the landmark recognized from the capture image by the camera having the high accuracy in the angular direction with respect to the subject vehicle. Accordingly, it may be possible to estimate the landmark position with respect to the subject vehicle by using the more accurate value of not only the landmark distance with respect to the subject vehicle but also the landmark elevation angle with respect to the subject vehicle Hence, even in the case of the landmark having the height higher than the road surface, it may be possible to accurately estimate the position with respect to the subject vehicle. As the result, it may be possible to more accurately identify the vehicle position on the map by collating the estimated landmark position with respect to the subject vehicle with the landmark position on the map in the map data. Accordingly, when the subject vehicle position is identified based on the landmark position, with respect to the subject vehicle, detected by the autonomous sensor of the subject vehicle, it may be possible to improve the accuracy of identifying the subject vehicle position.

Multiple embodiments will be described with reference to the drawings.

First Embodiment

<Schematic Configuration of Vehicle System>

Hereinafter, a first embodiment of the present disclosure will be described with reference to the drawings. A vehicle system 1 shown in FIG. 1 is used for a vehicle having a driving assistance function that assists a driving operation by a driver. The driving assistance function described here may include a function of an automatic driving function that substitutes for the driving operation of the driver. On example of the driving assistance includes a steering correction for maintaining a lane or the like.

As shown in FIG. 1, the vehicle system 1 includes a vehicle position identification device 10, a GNSS receiver 20, a communication module 30, a periphery monitoring sensor 40, a driving assistance device 50, and a display device 60. The vehicle position identification device 10 may be connected to an in-vehicle LAN 70. Hereinafter, a vehicle using the vehicle system 1 is referred to as a subject vehicle. Although the vehicle using the vehicle system 1 is not necessarily limited to an automobile, hereinafter, an example using the automobile will be described.

The GNSS receiver 20 receives positioning signals from multiple positioning satellites. The GNSS receiver 20 sequentially identifies coordinate information indicating a current position of the subject vehicle based on the positioning signals. The GNSS receiver 20 outputs the identified coordinate information to the vehicle position identification device 10. The coordinate information may be coordinate information indicating a latitude, a longitude, and an altitude.

The communication module 30 transmits information to a server outside the subject vehicle and receives information from the server via a public network. The communication module 30 downloads and acquires map data from a server (hereinafter, map server) storing the map data. The map data stored in the map server includes information related to a landmark position. The information related to the landmark position is, for example, coordinate information. The landmark position may be represented by, for example, center coordinates of the landmark or the like. The landmark is an object that is a mark, and a spatial position of the object is fixed. The landmarks include a structure of which height is higher than a road surface. The description of "height is higher than a road surface" means that markings drawn on the road surface such as lane markings and road markings are not included. Examples of the landmarks having a height higher than the road surface include, buildings, road signs, signboards, traffic lights, poles, beacon stations placed above the road surface, and the like. The poles may include street lights and utility poles. An object having a height higher than the road surface may be, for example, an object having a height, from the road surface, equal to or higher than a vehicle height.

The map data stored in the map server may include, for example, a road segment in which a road shape is represented by a three dimensional spline curve. For example, the map server collects information obtained by the periphery monitoring sensors 40 of multiple vehicles, and thereby this map data may be sequentially updated.

As the communication module 30, for example, a DCM (Data Communication Module) may be used or the like. As the GNSS receiver 20, a configuration provided in a DCM or the like may be used.

The periphery monitoring sensor 40 is configured as a sensor module including an autonomous sensor monitoring the periphery of the subject vehicle and a control unit for the autonomous sensor. As the periphery monitoring sensor 40, an autonomous sensor capable of identifying an object position around the subject vehicle with respect to the subject vehicle by using the sensing result may be used. In the present embodiment, the periphery monitoring sensor 40 includes, as the autonomous sensor, a distance measuring sensor 401 and a camera 402.

The distance measuring sensor 401 is a sensor for measuring the distance with high accuracy. The distance measuring sensor 401 recognizes a distance form the subject vehicle to an object based on a detection result of a reflected wave generated when a transmitted exploration wave is reflected by the object.

Figure 2:
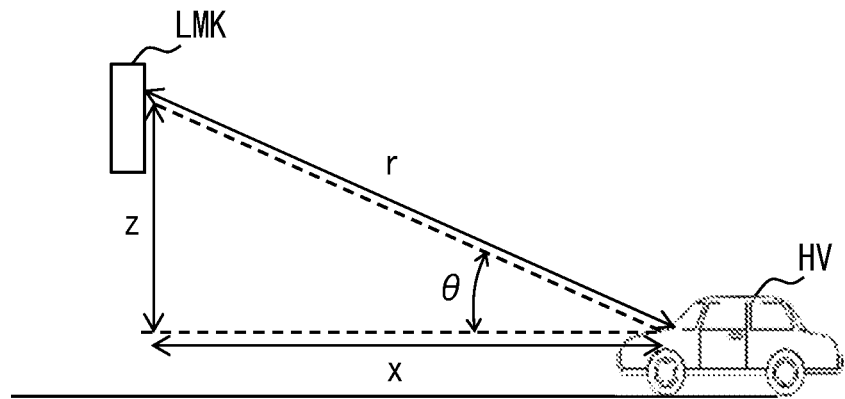
FIG. 2 is a view illustrating one example of a way of representing a landmark position with respect to a subject vehicle.
Figure 3:
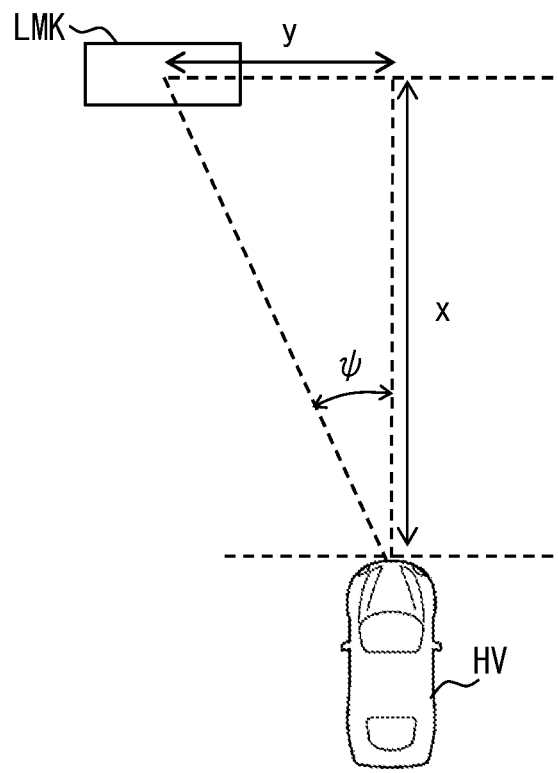
FIG. 3 is a view illustrating one example of a way of representing the landmark position with respect to the subject vehicle.

The distance measuring sensor 401 recognizes the presence or absence of the object based on the reception intensity of the reflected wave. The distance measuring sensor 401 recognizes the distance (see "r" in FIG. 2) from the subject vehicle to the object based on a time from the transmit of the exploration wave to the reception of the reflected wave. Hereinafter, the distance r recognized from the detection result of the distance measuring sensor 401 may be referred to as ψm. The control unit of the distance measuring sensor 401 recognizes an azimuth angle (see ψ in FIG. 3) of the object with respect to the subject vehicle based on a direction in which the exploration wave is transmitted. For example, the reference of the azimuth angle of the object with respect to the subject vehicle may be the front of the subject vehicle. Hereinafter, the azimuth angle ψ recognized from a detection result of the distance measuring sensor 401 is referred to as a ψ. The LMK in FIGS. 2 and 3 indicates the landmark. The HV in FIGS. 2 and 3 indicates the subject vehicles. The x, y, and z in FIGS. 2 and 3 indicate coordinate axes of the three dimensional coordinate with the reference point of the subject vehicle. The x is an axis in a front-rear direction, the y is an axis in a left-right direction, and the z is an axis in the height direction.

The control unit of the distance measuring sensor 401 inputs a sequentially recognized distance rm and a sequentially recognized azimuth angle ψm to the vehicle position identification device 10. For example, the control unit of the distance measuring sensor 401 may tentatively input, as the distance rm and the azimuth angle ψm of the landmark with respect to the subject vehicle, the distance rm and the azimuth angle ψm of the object of which existence is recognized, to the vehicle position identification device 10. Hereinafter, the distance rm and the azimuth angle ψm of the landmark with respect to this subject vehicle may be also referred to as first landmark (hereinafter, LMK) position information. The first LMK position information may include a relative speed of a landmark with respect to the subject vehicle recognized based on a doppler shift between the transmitted exploration wave and the reflected wave.

The distance measuring sensor 401 may use ultrasonic waves, light, electromagnetic wave, electric field magnetic field as the exploration wave. As the distance measuring sensor 401, a millimeter wave radar, a sonar, a LiDAR (Light Detection and Ranging/Laser Imaging Detection and Ranging), or the like may be employed. It is assumed that, a resolution of the distance measuring sensor 401 in an elevation angle is lower than a resolution in an azimuth angle direction, and an accuracy in the azimuth angle direction is lower than an accuracy in the elevation angle. In the present embodiment, hereinafter, a case of using a millimeter wave radar as the distance measuring sensor 401 will be described as an example.

The camera 402 takes an image in a predetermined capture range around the subject vehicle. The control unit of the camera 402 analyzes the image (hereinafter, capture image) taken by the camera 402. The control unit of the camera 402 analyzes the capture image as the detection result of the camera 402, and thereby recognizes the landmark in the capture image. As one example, the landmark in the capture image may be recognized by pattern recognition or the like. The control unit of the camera 402 may recognize the landmark position with respect to the subject vehicle based on the landmark position in the capture image and camera parameters of the camera 402. The camera parameters may be a position where the camera 402 is mounted on the subject vehicle, a direction of an optical axis of the camera 402, and the like. The control unit of the camera 402 may separately extract a background and the landmark from the capture image. The landmark may be extracted based on the size, the shape, the installation position, or the like.

The control unit of the camera 402 recognizes, as the landmark position with respect to the subject vehicle, the distance (see "r" in FIG. 2) from the subject vehicle to the landmark. Hereinafter, the distance r recognized from the capture image of the camera 402 may be also referred to as rc. The control unit of the camera 402 recognizes, as the landmark position with respect to the subject vehicle, the azimuth angle (see "ψ" in FIG. 3) of the landmark with respect to the subject vehicle. Hereinafter, the azimuth angle ψ recognized from the capture image of the camera 402 may be referred to as ψc. The control unit of the camera 402 recognizes, as the landmark position with respect to the subject vehicle, the elevation angle (see "θ" in FIG. 2) of the landmark with respect to the subject vehicle. The control unit of the camera 402 inputs to the vehicle position identification device 10, the landmark distance rc, the landmark azimuth angle ψc, and the landmark elevation angle θ that are sequentially recognized with respect to the subject vehicle. The landmark distance rc, the landmark azimuth angle ψc, and the landmark elevation angle θ with respect to the subject vehicle may be also referred to as second LMK position information.

The control unit of the camera 402 may detect a state quantity (hereinafter, behavior information) showing a subject vehicle behavior such as a yaw rate acting on the subject vehicle, a front rear direction acceleration, and a lateral direction acceleration from the capture image with use of a SfM (Structure from Motion) technology.

At least, detection areas of the distance measuring sensor 401 and the cameras 402 partially overlap each other so that the same landmark can be detected at the substantially same timing. The detection range of the periphery monitoring sensor 40 may be, at least, a predetermined range in front of the subject vehicle. The control unit of the periphery monitoring sensor 40 may be placed for each of the multiple autonomous sensors, or may be placed in common for the multiple autonomous sensors.

The driving assistance device 50 executes the driving assistance function described above. The driving assistance device 50 executes the driving assistance function based on the detailed position of the subject vehicle identified by the vehicle position identification device 10. As one example, the subject vehicle may travel along a lane center of the traveling lane.

The display device 60 displays information for an occupant of the subject vehicle. As the display device 60, for example, a display, an indicator, or the like can be employed. As one example, as the display device 60, an indicator placed at an instrument panel in front of a driver seat or the like may be employed.

The vehicle position identification device 10 includes, for example, a processor, a memory, an I/O, and a bus connecting these, and executes a process (hereinafter, detailed position identification related process) related to identification of the detailed position of the subject vehicle by executing a control program stored in a memory. The memory mentioned in the above is a non-transitory tangible storage medium that non-temporarily stores computer-readable program and data. The non-transitory tangible storage medium is embodied by a semiconductor memory or a magnetic disk. Hereinafter, the vehicle position identification device 10 will be described in detail.

<Schematic Configuration of Vehicle Position Identification Device>

Next, one example of a schematic configuration of the vehicle position identification device 10 will be described with reference to FIG. 1. The vehicle position identification device 10 includes, as shown in FIG. 1, a first LMK position information acquisition portion 101, a second LMK position information acquisition portion 102, a positioning portion 103, a LMK position estimation portion 104, a history storage portion 105, an estimation state identification portion 106, a map data acquisition portion 107, a vehicle position identification portion 108, and a display instruction portion 109 as functional blocks. In the drawings, the first LMK position information acquisition portion 101 may be also referred to as "1ST LMK INFO ACQ", the second LMK position information acquisition portion 102 may be also referred to as "2ND LMK INFO ACQ", and the estimation state identification portion 106 may be also referred to as "EST STATE IDENTIFICATION". Some or all of the functions executed by the vehicle position identification device 10 may be configured by hardware using one or more ICs or the like. Alternatively, some or all of the functional blocks of the vehicle position identification device 10 may be implemented by a combination of software executed by a processor and hardware.

The first LMK position information acquisition portion 101 acquires the first LMK position information from the distance measuring sensor 401. That is, the first LMK position information acquisition portion 101 acquires the distance rm and the azimuth angle ψm of the landmark with respect to the subject vehicle. The distance rm and the azimuth angle ψm are recognized from the detection result by the distance measuring sensor 401. The first LMK position information acquisition portion 101 corresponds to a first landmark position information acquisition portion. The process by this first LMK position information acquisition portion 101 corresponds to a first landmark position information acquisition step.

The second LMK position information acquisition portion 102 acquires the second LMK position information from the camera 402. That is, the second LMK position information acquisition portion 102 acquires the distance rc, the azimuth angle ψc of the landmark with respect to the subject vehicle, and the elevation angle θ. The distance rc and the azimuth angle ψc are recognized from the capture image by the camera 402. The second LMK position information acquisition portion 102 corresponds to a second landmark position information acquisition portion. The process by this second LMK position information acquisition portion 102 corresponds to a second landmark position information acquisition step.

The positioning portion 103 estimates a rough current position of the subject vehicle in a global coordinate system. As one example, the positioning portion 103 estimates the rough current position of the subject vehicle in the global coordinate system based on the coordinate information acquired from the GNSS receiver 20 and the behavior information such the vehicle speed of the subject vehicle or the yaw rate. As the behavior information, behavior information that input via the in-vehicle LAN 70 or the like and detected by the sensor of the subject vehicle may be employed. In addition, behavior information detected from the capture image with use of the SfM technique may be employed.

The positioning portion 103 may be not included in the vehicle position identification device 10. In this case, the vehicle position identification device 10 may acquire the rough current position of the subject vehicle in the global coordinate system from a unit that is placed outside the vehicle position identification device 10 and has the function of the positioning portion 103.

As shown in FIG. 1, the LMK position estimation portion 104 includes a prediction process portion 141, a correlation process portion 142, and an update process portion 143 as sub-functional blocks. The LMK position estimation portion 104 corresponds to a landmark position estimation portion. The LMK position estimation portion 104 estimates a detailed position (hereinafter, LMK detailed position) with respect to the subject vehicle based on the azimuth angle ψc and the elevation angle θ of the landmark with respect to the subject vehicle in addition to the distance rm of the landmark with respect to the subject vehicle. The distance rm is acquire by the first LMK position information acquisition portion 101. The azimuth angle ψc and the elevation angle θ are acquired by the second LMK position information acquisition portion 102. Hereinafter, the estimation of the detailed position of the landmark with respect to the subject vehicle may be also referred to as a LMK position estimation. The process by this LMK position estimation portion 104 corresponds to a landmark position estimation step.

The LMK position estimation portion 104 may use the azimuth angle ψm acquired by the first LMK position information acquisition portion 101 instead of the azimuth angle ψc acquired by the second LMK position information acquisition portion 102. However, since the accuracy in the angular direction of the camera 402 is high, it is preferable to use the azimuth angle ψc recognized by the camera 402 as compared with the azimuth angle ψm recognized by the distance measuring sensor 401. Hereinafter, a case of using the azimuth angle ψc recognized by the camera 402 will be described as an example.

The prediction process portion 141 predicts the landmark position with respect to the subject vehicle at a current time point based on the subject vehicle behavior information and the LMK detailed position, at a previous time point, estimated by the LMK position estimation portion 104. This prediction process portion 141 corresponds to a prediction portion. Hereinafter, the process by the prediction process portion 141 may be also referred to as a prediction process. As the subject vehicle behavior information, behavior information that is input via the in-vehicle LAN 70 or the like and detected by the sensor of the subject vehicle may be used. In addition, the behavior information detected from the capture image with use of the SfM technique may be used.

As one example, based on a vehicle speed $V_t$ of the subject vehicle at the current time point and the LMK detailed position ($x_{t-1}$, $y_{t-1}$, $z_{t-1}$), estimated by the LMK position estimation portion 104, at the previous time point, a position ($x_t$, $y_t$, $z_t$) calculated by a following expression may be predicted as the landmark position with respect to the subject vehicle at the current time point. Also, in the following, the landmark position with respect to the subject vehicle may be represented in coordinates in the three-dimensional space of the x, y, and z axes described above. The $x_t$ may be calculated by an expression of $x_t = x_{t-1} \cdot \Delta t \cdot V_t$. The $\Delta t$ is a time difference between the previous time point and the current time point. The $y_t$ may be calculated by an expression of $y_t = y_{t-1}$, and the $z_t$ may be calculated by an expression of $z_t = z_{t-1}$.

The prediction process portion 141 may use a tentative value when the LMK detailed position, estimated by the LMK position estimation portion 104, at the previous time point does not exist. For example, the prediction process portion 141 may use a position calculated by using the following expressions based on the distance rc recognized by the camera 402, the azimuth angle ψc, the elevation angle θ. The $x_{t-1}$ may be calculated by an expression of $x_{t-1}=rc_t \cdot \cos(\theta_{t-1}) \cdot \sin(\psi c_{t-1})$. The $y_{t-1}$ may be calculated by an expression of $y_{t-1}=rc_t \cdot \cos(\theta_{t-1}) \cdot \cos(\psi c_{t-1})$. The $z_{t-1}$ may be calculated by an expression of $z_{t-1}=rc_t \cdot \sin(\theta_{t-1})$.

The correlation process portion 142 identifies a combination of the first LMK position information and the second LMK position information used for the LMK position estimation. The correlation process portion 142 identifies a combination of information estimated as information about same landmark, based on the first LMK position information obtained by the distance measuring sensor 401 and the second LMK position information obtained by the camera 402. That is, the correlation process portion 142 identifies the combination of the first LMK position information and the second LMK position information whose positions are close to the same landmark position predicted by the prediction process portion 141. The process by the correlation process portion 142 may be also referred to as a correlation process.

Hereinafter, one example of the details of the correlation process portion 142 will be described. The correlation process executes a process for each of the first LMK position information and the second LMK position information. The correlation process portion 142 determines a ground speed of the provisional landmark obtained by the first LMK position information and a ground speed of the landmark obtained by the second LMK position information. Thereby, the correlation process portion 142 extracts the first LMK position information and the second LMK position information of a stationary object.

As one example, the ground speed of the first LMK position information may be determined based on a relative speed in the first LMK position information and the vehicle speed of the subject vehicle. Then, the one having a ground speed of approximately 0 may be extracted. The approximately 0 is a value of substantially 0 including an error range. The relative speed may be calculated based on a time change of the first LMK position information for the same target. Regarding the second LMK position information, the relative speed of the landmark may be calculated based on a time change of the second LMK position information for the same landmark. The relative speed of the landmark may be determined based on the calculated relative speed and the vehicle speed of the subject vehicle, and the ground speed of approximately 0 may be extracted.

In the correlation process, for the extracted first LMK position information and the extracted second LMK position information, the predicted landmark positions (hereinafter, prediction LMK position) predicted by the prediction process portion 141 with respect to the subject vehicle are compared. The landmark distance rm and the landmark azimuth angle ψm with respect to the subject vehicle in the first LMK position information are compared with the landmark distance and the landmark azimuth angle for the prediction LMK position. Among all the errors of the distance and the azimuth angle, errors within a threshold range with respect to the target prediction LMK position are extracted. The threshold described here may be set to a range approximated so as to be estimated as a value for the same landmark.

The landmark distance rc, the landmark azimuth angle ψc, and the landmark elevation angle θ with respect to the subject vehicle in the second LMK position information are compared with the landmark distance, the landmark azimuth angle, and the landmark elevation angle for the prediction LMK position. Among all the errors of the distance, the azimuth angle, and the elevation, errors within a threshold range with respect to the target prediction LMK position are extracted. The threshold range described here may be same as that of the first LMK position information. The threshold range may be a range different from that of the first LMK position information when being approximated to be estimated as the value of the same landmark.

The correlation process identifies the correlation of the first LMK position information and the second LMK position information within the threshold range with respect to the prediction LMK position of the same landmark. There is a high possibility that the first LMK position information and the second LMK position information within the threshold range with respect to the prediction LMK position of the same landmark are the first LMK position information and the second LMK position information that are information of the same landmark. Accordingly, it may be possible to accurately prevent a combination of the first LMK position information and the second LMK position information of different landmarks from being identified. The first LMK position information and the second LMK position information of different landmarks cause the estimation accuracy of the detailed landmark position by the update process portion 143 as described later to decrease.

The correlation process portion 142 stores the first LMK position information and the second LMK position information that have the identified combination in the history storage portion 105. Although the history storage portion 105 may be a non-volatile memory, for example, the history storage portion 105 may be a volatile memory. The correlation process portion 142 stores, for each time point, the first LMK position information and the second LMK position information of the identified combination in the history storage portion 105 in association with each other. It is preferable that the correlation process portion 142 stores in the history storage portion 105, the behavior information of the subject vehicle at the same time point in association with the first LMK position information and the second LMK position information. When multiple landmarks are recognized, the correlation process portion 142 stores in the history storage portion 105, the first LMK position information and the second LMK position information whose combination is identified for each of the multiple landmarks, in a state where the first LMK position information and the second LMK position information are associated with each other.

Even when either of the first LMK position information or the second LMK position information is not within the threshold range with respect to the prediction LMK position, it is assumed that the autonomous sensor cannot be used (that is, lost), the correlation process portion 142 may store the one within the threshold range with respect to the prediction LMK position. For example, when the first LMK position information is not within the threshold range with respect to the prediction LMK position, it is assumed that the recognition of the landmark by the distance measuring sensor 401 is lost, and the second LMK position information may be stored. On the other hand, when the second LMK position information is not within the threshold range with respect to the prediction LMK position, it is assumed that the recognition of the landmark by the camera 402 is lost, and the first LMK position information may be stored.

The update process portion 143 estimates the detailed landmark position (that is, LMK detailed position) with respect to the subject vehicle based on the behavior information at the current time point, the past behavior information stored in the history storage portion 105, and the past combination of the first LMK position information and the second LMK position information, in addition to the combination of the first LMK position information and the second LMK position information identified by the correlation process portion 142 at the current time point. Hereinafter, the process by the update process portion 143 may be also referred to as the update process. The combination of the past behavior information, the first LMK position information, and the second LMK position information that are stored in the history storage portion 105 is a history of the behavior information, the first LMK position information, and the second LMK position information. The update process portion 143 uses this history, and thereby estimates a true value of the landmark position obtained by reducing an observation noise of the autonomous sensor as the detailed position.

Here, one example of the details of the update process by the update process portion 143 will be described with reference to FIG. 4. The update process calculates values of the x, y, and z coordinates of the landmark position (hereinafter, LMK provisional position) with respect to the subject vehicle at the current time point. The value of the x coordinate of the LMK provisional position at the current time point is $x_t$, and the value of the y coordinate is $y_t$, and the value of the z coordinate is $z_t$. The $x_t$ is calculated based on the distance $rm_t$ of the first LMK position information at the current time point and the azimuth angle $\psi c_t$ and the elevation angle $\theta_t$ of the second LMK position information at the current time point. As one example, the $x_t$ is calculated by an expression of $x_t = rm_t \cdot \cos(\theta_t) \sin(\psi c_t)$. The $y_t$ is calculated based on the distance $rm_t$ of the first LMK position information at the current time point and the azimuth angle $\psi c_t$ and the elevation angle $\theta_t$ of the second LMK position information at the current time point. As one example, the $y_t$ is calculated by an expression of $y_t = rm_t \cdot \cos(\psi c_t) \cdot \cos(\psi c_t)$. The $z_t$ is calculated based on the distance $rm_t$ of the first LMK position information at the current time point and the elevation angle $\theta_t$ of the second LMK position information at the current time point. As one example, the $z_t$ is calculated by an expression of $z_t = rm_t \cdot \sin(\theta_t)$. The $x_t$ is calculated based on the vehicle speed $V_t$ of the behavior information of the subject vehicle at the current time point and the x coordinate value $x_{t-1}$ of the LMK detailed position estimated by the LMK position estimation portion 104 at the previous time point. As one example, the $x_t$ may be calculated by an expression of $x_1 = x_{t-1} \cdot \Delta t \cdot V_t$.

The update process estimates the LMK detailed position (x, y, z) at the current time point with use of the least squares method, based on the values of the x, y, and z coordinates of the LMK provisional position $(x_t, y_t, z_t)$ at the current time point as calculated above and the history of these values calculated by the past update process. The history of $x_t = fm_t \cdot \cos(\theta_t) \cdot \sin(\psi c_t)$ is $x_{t-n} = rm_{t-n} \cdot \cos(\theta_{t-n}) \cdot \sin(\psi c_{t-n})$. The history of $y_t = rm_t \cdot \cos(\theta_t) \cdot \cos(\psi c_t)$ is $y_{t-n} = rm_{t-n} \cdot \cos(\theta_{t-n}) \cdot \cos(\theta c_{t-n})$. The history of $z_t = rm_t \cdot \sin(\theta_t)$ is $z_{t-n} = rm_{t-n} \cdot \sin(\theta_{t-n})$. The history of $x_t = x_{t-1} \cdot \Delta t \cdot V_t$ is $x_{t-n} = x_{t-n-1} \cdot \Delta t \cdot V_{t-n}$. The value calculated by the update process portion 143 in the past may be stored in the history storage portion 105, and thereby the history may be read from the history storage portion 105. The n is an integer of 1 or more, and may be arbitrarily set in consideration of a trade-off relationship between the accuracy and a process load.

The update process may use a RANSAC (Random Sample Consensus) instead of the least squares method. In a case of using the RANSAC, the RANSAC can eliminate outliers. Therefore, even when the correlation process includes an erroneous data, it may be possible to more accurately estimate the LMK detailed position. In addition, a Kalman filter may be used instead of the least squares method. In a case of using the Kalman filter, in a situation where the observation noise shows a normal distribution, it may be possible to more accurately estimate the LMK detailed position. Hereinafter, the case of using the least squares method will be described as an example.

The LMK position estimation portion 104 executes the update process of estimating the LMK detailed position based on the first LMK position information and the second LMK position information of the combination identified by the correlation process portion 142 when the correlation process portion 142 can identify the combination of the first LMK position information and the second LMK position information. The autonomous sensor that is not within the threshold range with respect to the prediction LMK position in the correlation process may execute the update process with use of this prediction LMK position instead of the first LMK position information and the second LMK position information. That is, the lost autonomous sensor may execute the update process using a position predicted based on the LMK detailed position at the previous time point.

The estimation state identification portion 106 identifies a state (hereinafter, LMK position estimation state) of the LMK position estimation by the LMK position estimation portion 104. The LMK position estimation state includes an error (hereinafter, LMK position estimation error) of the LMK position estimation, a state (hereinafter, usage sensor state) showing which autonomous sensor is used for the LMK position estimation, or the like. That is, the state where the distance measuring sensor 401 or the camera 402 can be used for the LMK position estimation is the usage sensor state.

The estimation state identification portion 106 may determine that, for example, the autonomous sensor that is not within the threshold range with respect to the prediction LMK position in the correlation process cannot be used for the LMK position estimation. As shown by an expression in FIG. 5, the estimation error may be calculated as the square root of the sum of squared values of each difference between the coordinate value (x, y, z) of the LMK detailed position estimated by the update process and the coordinate values (xt, yt, zt) to (xt-n, yt-n, zt-n) at the current time point and in the history. The estimation error may be, for example, the sun of x, y and z, or a maximum value among the x, the y, and the z.

The estimation state identification portion 106 outputs the identified LMK position estimation state to the driving assistance device 50. The driving assistance device 50 may use the LMK position estimation state to determine whether the detailed position of the subject vehicle can be used. For example, when the LMK position estimation error is greater than the threshold, the driving assistance device 50 may not use the detailed position of the subject vehicle. In addition, when the usage sensor state is not a state (hereinafter, both-usable state) where both of the distance measuring sensor 401 and the camera 402 can be used, the driving assistance device 50 may not use the detailed position of the subject vehicle. The driving assistance device 50 may use the LMK position estimation state for changing the degree of the driving assistance. For example, when the LMK position estimation error is greater than the threshold or when the usage sensor state is not the both-usable state, a control torque of a vehicle control in the driving assistance using the detailed position of the subject vehicle may be weakened.

The map data acquisition portion 107 may acquire the map data including the portion on the map of the landmark. The process by this map data acquisition portion 107 corresponds to a map data acquisition step. The map data acquisition portion 107 may acquire the map data around the subject vehicle from a map server. For example, the map data acquisition portion 107 may acquire the map data within the predetermined distance from the subject vehicle current position measured by the positioning portion 103. When the map data is divided for each section and managed, the map data in the section including the current position of the subject vehicle may be acquired. The map data acquisition portion 107 may acquire only the data related to the landmarks in the map data.

The vehicle position identification portion 108 performs localization of identifying the subject vehicle position (that is, detailed position) on the map by collating the LMK detailed position estimated by the LMK position estimation portion 104 with a position (hereinafter, map LMK position) on the map of the landmark in the map data acquired by the map data acquisition portion 107. The process by this vehicle position identification portion 108 corresponds to a vehicle position identification step. For example, the vehicle position identification portion 108 matches the LMK detailed position with the map LMK position. The vehicle position identification portion 108 may identify a position shifted from the map LMK position on the map by an offset of the subject vehicle position with respect to the LMK detailed position, as the subject vehicle detailed position on the map.

The vehicle position identification portion 108 may match the LMK detailed position with the map LMK position by using a scan matching method such as an ICP (Iterative Closest Point) algorithm used for a SLAM (Simultaneous Localization and Mapping). The vehicle position identification portion 108 may preferentially use the LMK detailed position in the usage sensor state where the estimation state identification portion 106 can use both of the distance measuring sensor 401 and the camera 402. Thereby, since the matching using the LMK detailed position considered to have higher accuracy is performed, it may be possible to improve the identification accuracy of the subject vehicle position.

The display instruction portion 109 causes the display device 60 to perform display in accordance with the LMK position estimation state identified by the estimation state identification portion 106. For example, the display instruction portion 109 may cause the display device 60 to perform display in accordance with the usage sensor state. That is, in accordance with the difference of the state where the distance measuring sensor 401 or the camera 402 can be used for the LMK position estimation, a display mode by the display device 60 may be changed. Examples of changing the display mode include changing a display color, changing a displayed icon, or the like, For example, the display instruction portion 109 may change the display mode so as to distinguish the both-usable state where both of the distance measuring sensor 401 and the camera 402 can be used for the LMK position estimation, a one-usable state where either of them can be used, and a both-lost state where both of them cannot be used. The display instruction portion 109 may change the display mode based on whether the state is the both-usable state, without changing the display mode in the one-usable state and the both-lost state. The display instruction portion 109 may change the display mode by the display device 60 in accordance with the size of LMK position estimation error. According to the configuration described above, a subject vehicle occupant may be possible to confirm whether the identification accuracy of the subject vehicle position is high.

<Detailed Position Identification Related Process by Vehicle Position Identification Device>

Figure 6:
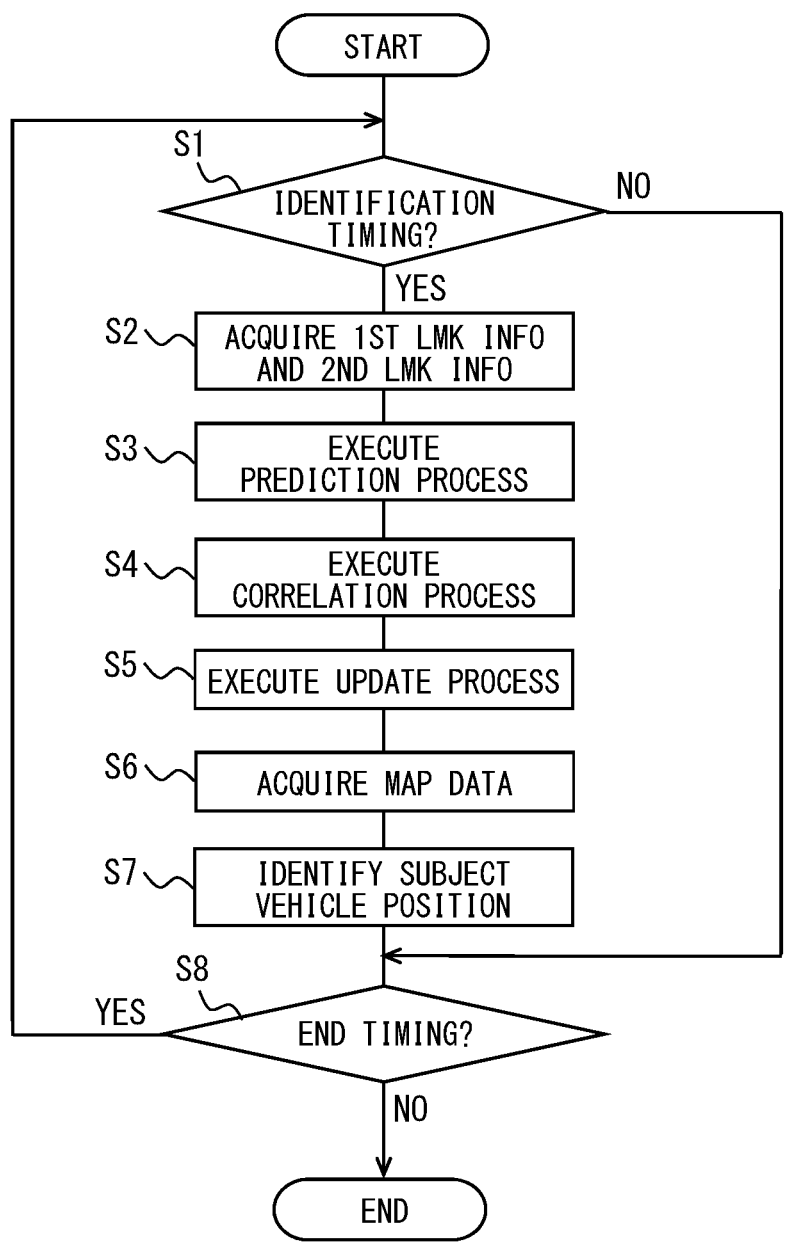
FIG. 6 is a flowchart showing one example of a flow of a detailed position identification related process by a vehicle position identification device.

Here, one example of a flow of the detailed position identification related process by the vehicle position identification device 10 will be described with reference to a flowchart of FIG. 6. Execution of the detailed position identification related process by the computer corresponds to execution of the vehicle position identification method. The process shown in FIG. 6 may be configured to, for example, start when switch for starting an internal combustion engine or a motor generator of the subject vehicle is turned on. The switch for starting the vehicle is also referred to as a power switch.

In 51, when it is a timing (hereinafter, identification timing) to identify the vehicle position of the subject vehicle (YES in S1), the process shifts to S2. On the other hand, when the timing is not the identification timing (NO in S1), the process shifts to S8. The identification timing may be, for example, a timing at which the detection result by the periphery monitoring sensor 40 is updated. When detection cycles of the distance measuring sensor 401 and the camera 402 are different from each other, the identification timing is adjusted in accordance with either of them. When the identification timing is adjusted in accordance with the camera 402, the cycle corresponding to a frame rate is the identification timing. For example, the vehicle position identification device 10 monitors the periphery monitoring sensor 40, and thereby whether the detection result by the periphery monitoring sensor 40 has been updated may be determined.

In S2, the first LMK position information acquisition portion 101 acquires the first LMK position information input from the distance measuring sensor 401. The second LMK position information acquisition portion 102 acquires the second LMK position information from the camera 402.

In S3, the prediction process portion 141 of the LMK position estimation portion 104 executes the prediction process. The prediction process predicts the landmark position (that is, prediction LMK position) with respect to the subject vehicle at the current time point based on the behavior information of the subject vehicle and the LMK detailed position at the previous time point, when there is the LMK detailed position estimated by the LMK position estimation portion 104 at the previous time point. The prediction process uses the tentative value as the prediction LMK position as described above when there is not the LMK detailed position estimated by the LMK position estimation portion 104 at the previous time point.

In S4, the correlation process portion 142 of the LMK position estimation portion 104 executes the correlation process. The correlation process identifies the combination of the first LMK position information and the second LMK position information whose positions are close to the prediction LMK position predicted in S3 based on the first LMK position information and the second LMK position information that are acquired in S2.

In S5, the update process portion 143 of the LMK position estimation portion 104 executes the update process. The update process estimates the LMK detailed position based on the behavior information at the current time point, the past behavior information stored in the history storage portion 105, and the combination of the past first LMK position information and the past second LMK position information, in addition to the combination of the first LMK position information and the second LMK position information, at the current time point, that are identified in S4.

In S6, the map data acquisition portion 107 may acquire the map data including the portion on the map of the landmark. The process in S6 may be executed before the process in S5. The process in S6 may not be executed every time the flowchart in FIG. 6 is repeated, and, for example, may newly acquire the traveling distance of the subject vehicle or the like.

In S7, the vehicle position identification portion 108 identifies the detailed position of the subject vehicle on the map by collating the LMK detailed position estimated in S5 with the map LMK position in the map data acquired in S6.

In S8, when the timing is an end timing of the detailed position identification related process (YES in S8), the detailed position identification related process ends. On the other hand, when the timing is not the detailed position identification related process (NO in S8), the process returns to S1, and the processes are repeated. One example of the end timing of the detailed position identification related process is a timing when the power switch is turned off.

OVERVIEW OF FIRST EMBODIMENT

According to the configuration in the first embodiment, in addition to the distance rm between the landmark recognized from the detection result by the distance measuring sensor 401 and the subject vehicle, the elevation angle θ of the landmark recognized from the capture image by the camera 402 is used for estimating the position with respect to the landmark higher than the road surface. Since the distance measuring sensor 401 is a sensor for measuring the distance, the distance rm is more accurate than the distance rc of the landmark recognized from the capture image by the camera 402 with respect to the subject vehicle.

On the other hand, the distance measuring sensor 401 tends to have lower accuracy in the elevation angle direction with respect to the landmark having a height higher than the road surface. On the other hand, the configuration of the first embodiment uses the elevation angle θ of the landmark recognized from the capture image by the camera 402 having the high accuracy in the angular direction with respect to the subject vehicle. Accordingly, it may be possible to estimate the landmark position with respect to the subject vehicle by using the more accurate value of not only the landmark distance with respect to the subject vehicle but also the landmark elevation angle with respect to the subject vehicle.

Hence, even in the case of the landmark having the height higher than the road surface, it may be possible to accurately estimate the position with respect to the subject vehicle. As the result, it may be possible to more accurately identify the subject vehicle position on the map by collating the estimated landmark position with respect to the subject vehicle with the landmark position on the map in the map data. Accordingly, when the subject vehicle position is identified based on the landmark position, with respect to the subject vehicle, detected by the autonomous sensor of the subject vehicle, it may be possible to improve the accuracy of identifying the subject vehicle position.

According to the configuration of the first embodiment, the behavior information of the subject vehicle is used for estimating the landmark position with respect to the subject vehicle. Therefore, it may be possible to reduce the estimation error of the landmark position with respect to the subject vehicle due to the subject vehicle behavior. Further, according to the configuration of the first embodiment, the histories of the distance rm recognized by the distance measuring sensor 401, the elevation angle θ recognized by the camera 402, and the behavior information of the subject vehicle are used. Therefore, by using the histories, it may be possible to reduce the estimation error of the landmark position with respect to the subject vehicle due to the observation noise of the autonomous sensor.

As described above, according to the configuration of the first embodiment, it may be possible to estimate the landmark position with respect to the subject vehicle with extremely high accuracy by integrally handling the distance rm recognized by the distance measuring sensor 401 having the better distance accuracy, the elevation angle θ recognized by the camera 402 having the better angular direction accuracy, the behavior information of the subject vehicle, and these histories. As the result, it may be possible to extremely improve the accuracy of identifying the subject vehicle position.

Although there is an idea that multiple autonomous sensors are used for target recognition for avoiding the proximity of obstacles, the idea is different from that of the present embodiment. In the target recognition for avoiding the proximity of obstacles, erroneous recognition is reduced depending on whether the multiple autonomous sensors can recognize the same position, or the loss of some of the autonomous sensors is supplemented. On the other hand, in the configuration of the first embodiment, the distance accuracy and the elevation angle direction accuracy in the landmark position estimation are improved based on the distance rm recognized by the distance measuring sensor 401 having the better distance accuracy and the elevation angle θ recognized by the camera 402 having the better angular direction accuracy. Further, the accuracy of identifying the subject vehicle position is improved. In the target recognition for avoiding the proximity of the obstacles, it is assumed that a height of the target is about a height of the subject vehicle. Therefore, there is no idea to improve the elevation angle direction accuracy.

Second Embodiment

In the first embodiment, the case where the subject vehicle behavior information used for the LMK detailed position estimation by the LMK position estimation portion 104 is the vehicle speed has been described as the example. However, it is not limited to this. For example, the yaw rate may be used for the subject vehicle behavior information for the LMK detailed position estimation by the LMK position estimation portion 104. In this case, the expression for calculating the $x_t$ and the $y_t$ in the prediction process and the update process may be modified in accordance with the yaw rate of the subject vehicle.

According to the configuration described above, it may be possible to reduce the estimation error of the landmark position with respect to the subject vehicle due to turning of the subject vehicle. Therefore, it may be possible to improve the accuracy of estimating the LMK detailed position.

Third Embodiment

In the first embodiment, the detection ranges of each of the distance measuring sensor 401 and the camera 402 are the predetermined ranges in front of the subject vehicle. However, it is not limited to this. For example, in addition to the distance measuring sensor 401 and the camera 402, another distance measuring sensor 401 and another camera 402 each having a detection range partially overlapping with the predetermined range in front of the subject vehicle may be used. For example, in addition to the distance measuring sensor 401 and the camera 402 each having the detection range that is the predetermined range in front of the subject vehicle, a distance measuring sensor 401 and a camera 402 each having a detection range that is a predetermined range on a front lateral side of the subject vehicle may be used. According to this, it may be possible to improve the estimation accuracy of the LMK detailed position by increasing the number of samples of the first LMK position information and the second LMK position information of the landmark detected in the areas where the detection ranges overlap to increase the number of terms in the update process.

For example, in addition to the distance measuring sensor 401 and the camera 402 each having the detection range that is the predetermined range in front of the subject vehicle, a distance measuring sensor 401 and a camera 402 each having no detection range partially overlapping with the predetermined range in front of the subject vehicle may be used. Even in this case, it may be possible to improve the estimation accuracy of the LMK detailed position by shifting a time axis and increasing the number of samples of the first LMK position information and the second LMK position information of the landmark detected in the areas where the detection ranges overlap, and increase the number of terms in the update process.

Fourth Embodiment

In the first embodiment, the behavior information of the subject vehicle and the history are used for the LMK detailed position estimation. However, it is not limited to this. For example, the behavior information of the subject vehicle and the history may not be used for the LMK detailed position estimation. Even in the configuration described above, it may be possible to estimate the landmark position with respect to the subject vehicle by using the more accurate value of not only the distance of the landmark with respect to the subject vehicle but also the elevation angle of the landmark with respect to the subject vehicle Accordingly, when the subject vehicle position is identified based on the landmark position, with respect to the subject vehicle, detected by the autonomous sensor of the subject vehicle, it may be possible to improve the accuracy of identifying the subject vehicle position.

Fifth Embodiment

In the first embodiment, the vehicle position identification device 10 acquires the map data from the outside of the subject vehicle via the communication module 30. However, it is not limited to this. For example, the vehicle position identification device 10 may acquire the map data from a non-volatile memory mounted on the subject vehicle. This non-volatile memory may be placed outside the vehicle position identification device 10, or may be placed inside the vehicle position identification device 10.

Sixth Embodiment

In the first embodiment, the example in which the GNSS receiver 20 is placed separately from the vehicle position identification device 10. However, it is not limited to this. For example, the GNSS receiver 20 and the vehicle position identification device 10 may be integrated.

Note that the present disclosure is not limited to the embodiments described above and can variously be modified within the scope of the present disclosure. An embodiment obtained by appropriately combining the technical features disclosed in the different embodiments may also be included in the technical scope of the present disclosure. The control device and the control method described in the present disclosure may be implemented by a special purpose computer which includes a processor programmed to execute one or more functions executed by computer programs. Alternatively, the control device and the control method described in the present disclosure may be implemented by a special purpose hardware logic circuit. Alternatively, the control device and the control method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

It is noted that a flowchart or the process of the flowchart in the present disclosure includes multiple steps (also referred to as sections), each of which is represented, for example, as S1. Further, each step can be divided into several sub-steps while several steps can be combined into a single step.

The invention claimed is:

1. A vehicle position identification device for a vehicle, the vehicle position identification device comprising:
    a first landmark position information acquisition portion configured to acquire first landmark position information including, at least, a landmark distance with respect to a subject vehicle as position information of a landmark with respect to the subject vehicle, wherein the landmark distance is recognized from a detection result of a distance measuring sensor mounted on the vehicle, and a height of the landmark is higher than a height of a road surface;
    a second landmark position information acquisition portion configured to acquire second landmark position information including, at least, a landmark elevation angle with respect to the subject vehicle, as the position information of the landmark with respect to the subject vehicle, wherein the landmark elevation angle is recognized from a capture image by a camera mounted on the vehicle;
    a landmark position estimation portion configured to estimate a landmark position with respect to the subject vehicle using the landmark elevation angle recognized from the capture image by the camera and the landmark distance recognized from the detection result of the distance measuring sensor;
    a map data acquisition portion configured to acquire map data including a landmark position on a map; and
    a vehicle position identification portion configured to identify a vehicle position on the map by collating the landmark position, estimated by the landmark position estimation portion, with respect to the subject vehicle with the landmark position on the map in the map data;
    an estimation state identification portion configured to calculate an estimation error of the landmark position with respect to the subject vehicle, wherein:

the estimation error is used to determine whether the distance measuring sensor or the camera is usable for estimating the landmark position;

when the estimation error is greater than a threshold, the estimation state identification portion performs a determination that the distance measuring sensor and the camera are not usable, and the vehicle traveling is adjusted based on the determination and the estimation error is calculated using the second landmark position information based on the capture image by the camera; and a display instruction portion configured to cause a display device mounted on the vehicle to perform a display in accordance with the estimation error, the display instruction portion further configured to cause the display device to change a display mode in accordance with a difference of the state showing that the distance measuring sensor or the camera is usable for estimating the landmark position, wherein the identified vehicle position is output to a driving assistance device to cause the driving assistance device to adjust vehicle traveling.

2. The vehicle position identification device according to claim 1, further comprising:

a prediction portion configured to predict the landmark position with respect to the subject vehicle based on subject vehicle behavior information and the landmark position that is located with respect to the subject vehicle and estimated by the landmark position estimation portion at a previous time point; and a correlation process portion configured to identify a combination of the first landmark position information and the second landmark position information, the positions of which are within a threshold range defined using an identical landmark position predicted by the prediction portion, wherein the landmark position estimation portion estimates the landmark position with respect to the subject vehicle based on the first landmark position information and the second landmark position information of the combination identified by the correlation process portion.

3. The vehicle position identification device according to claim 1, further comprising:

a prediction portion configured to predict the landmark position with respect to the subject vehicle based on the landmark position that is located with respect to the subject vehicle and estimated by the landmark position estimation portion at a previous time point, wherein the landmark position estimation portion is configured to estimate the landmark position with respect to the subject vehicle by integrally using:

the landmark distance with respect to the subject vehicle in the first landmark position information acquired by the first landmark position information acquisition portion;

the landmark elevation angle with respect to the subject vehicle in the second landmark position information acquired by the second landmark position information acquisition portion;

the landmark distance between the landmark position predicted by the prediction portion and the subject vehicle; and a past history of the landmark distance in the first landmark position information, the landmark elevation angle, and the landmark distance between the landmark position predicted by the prediction portion and the subject vehicle.

4. The vehicle position identification device according to claim 3, wherein the landmark position estimation portion is configured to estimate the landmark position with respect to the subject vehicle by a least squares method using:

the landmark distance with respect to the subject vehicle in the first landmark position information acquired by the first landmark position information acquisition portion;

the landmark elevation angle with respect to the subject vehicle in the second landmark position information acquired by the second landmark position information acquisition portion;

the landmark distance between the landmark position predicted by the prediction portion and the subject vehicle; and a past history of the landmark distance in the first landmark position information, the landmark elevation an, and the landmark distance between the landmark position predicted by the prediction portion and the subject vehicle.

5. The vehicle position identification device according to claim 3, wherein the landmark position estimation portion is configured to estimate the landmark position with respect to the subject vehicle while using a random sample consensus and eliminating outliers based on:

the landmark distance with respect to the subject vehicle in the first landmark position information acquired by the first landmark position information acquisition portion;

the landmark elevation angle with respect to the subject vehicle in the second landmark position information acquired by the second landmark position information acquisition portion;

the landmark distance between the landmark position predicted by the prediction portion and the subject vehicle; and a past history of the landmark distance in the first landmark position information, the landmark elevation angle, and the landmark distance between the landmark position predicted by the prediction portion and the subject vehicle.

6. The vehicle position identification device according to claim 3, wherein the landmark position estimation portion is configured to estimate the landmark position with respect to the subject vehicle by a Kalman filter based on:

the landmark distance with respect to the subject vehicle in the first landmark position information acquired by the first landmark position information acquisition portion;

the landmark elevation angle with respect to the subject vehicle in the second landmark position information acquired by the second landmark position information acquisition portion;

the landmark distance between the landmark position predicted by the prediction portion and the subject vehicle; and a past history of the landmark distance in the first landmark position information, the landmark elevation angle, and the landmark distance between the landmark position predicted by the prediction portion and the subject vehicle.

7. A vehicle position identification method that is used for a vehicle and is performed by a computer, the vehicle position identification method comprising:

acquiring first landmark position information including, at least, a landmark distance with respect to a subject vehicle as position information of a landmark with respect to the subject vehicle, wherein the landmark distance is recognized from a detection result of a distance measuring sensor mounted on the vehicle, and a height of the landmark is higher than a height of a road surface;

acquiring second landmark position information including, at least, a landmark elevation angle with respect to the subject vehicle, as the landmark position information with respect to the subject vehicle, wherein the landmark elevation angle is recognized from a capture image by a camera mounted on the vehicle;

estimating a landmark position with respect to the subject vehicle using the landmark elevation angle recognized from the capture image by the camera and the landmark distance recognized from the detection result of the distance measuring sensor;

acquiring map data including a landmark position on a map;

identifying a vehicle position on the map by collating the estimated landmark position with respect to the subject vehicle with the landmark position on the map in the map data;

calculating an estimation error of the estimated landmark position with respect to the subject vehicle, wherein the estimation error is used to determine whether the distance measuring sensor or the camera is usable for estimating the estimated landmark position, and the estimation error is calculated using the second landmark position information based on the capture image by the camera;

for a state in which the estimation error is greater than a threshold, performing a determination that the distance measuring sensor and the camera are not usable, and adjusting the vehicle traveling based on the determination;

causing a display device mounted on the vehicle to perform a display in accordance with the estimation error, and causing the display device to change a display mode in accordance with a difference of the state showing that the distance measuring sensor or the camera is usable for estimating the estimated landmark position; and outputting the identified position to a driving assistance device to cause the driving assistance device to adjust vehicle traveling.

8. A vehicle position identification device for a vehicle, the vehicle position identification device comprising:

one or more processors; and a memory coupled to the one or more processors and storing program instructions that when executed by the one or more processors cause the one or more processors to at least:

acquire first landmark position information including, at least, a landmark distance with respect to a subject vehicle as position information of a landmark with respect to the subject vehicle, wherein the landmark distance is recognized from a detection result of a distance measuring sensor mounted on the vehicle, and a height of the landmark is higher than a height of a road surface;

acquire second landmark position information including, at least, a landmark elevation angle with respect to the subject vehicle, as the position information of the landmark with respect to the subject vehicle, wherein the landmark elevation angle is recognized from a capture image by a camera mounted on the vehicle;

estimate a landmark position with respect to the subject vehicle using the landmark elevation angle recognized from the capture image by the camera and the landmark distance recognized from the detection result of the distance measuring sensor;

acquire map data including a landmark position on a map;

identify a vehicle position on the map by collating the estimated landmark position with respect to the subject vehicle with the landmark position on the map in the map data;

calculate an estimation error of the estimated landmark position with respect to the subject vehicle, wherein the estimation error is used to determine whether the distance measuring sensor or the camera is usable for estimating the estimated landmark position, and the estimation error is calculated using the second landmark position information based on the capture image by the camera;

for a state in which the estimation error is greater than a threshold, perform a determination that the distance measuring sensor and the camera are not usable, and adjust the vehicle traveling based on the determination;

cause a display device mounted on the vehicle to perform a display in accordance with the estimation error, and cause the display device to change a display mode in accordance with a difference of the state showing that the distance measuring sensor or the camera is usable for estimating the estimated landmark position; and output the identified position to a driving assistance device to cause the driving assistance device to adjust vehicle traveling.

* * * * *